United States Patent
Pfitzmann et al.

(10) Patent No.: US 8,826,425 B2
(45) Date of Patent: Sep. 2, 2014

(54) SYSTEM AND METHOD FOR AUTOMATICALLY DISCOVERING SECURITY CLASSIFICATION OF HOSTS

(75) Inventors: Birgit Monika Pfitzmann, Hawthorne, NY (US); Harigovind Venkatraj Ramasamy, Hawthorne, NY (US); Cheng-Lin Tsao, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 651 days.

(21) Appl. No.: 12/628,420

(22) Filed: Dec. 1, 2009

(65) Prior Publication Data
US 2011/0131628 A1      Jun. 2, 2011

(51) Int. Cl.
*H04L 29/06* (2006.01)

(52) U.S. Cl.
USPC .......... 726/22; 726/1; 726/2; 726/13; 726/14; 726/23; 726/25; 709/223; 709/224; 709/227

(58) Field of Classification Search
CPC . H04L 63/14; H04L 63/1408; H04L 63/1425; H04L 63/20; H04L 63/30; H04L 63/302; H04L 63/306; H04L 63/308; H04L 41/12; H04L 41/14; H04L 41/142; H04L 14/145; H04L 12/2416; H04L 12/244; H04L 41/0889; H04L 45/02; H04L 43/00; H04L 43/02; H04L 43/022; H04L 43/024
USPC ................. 726/1–30; 709/223–229, 217–219
See application file for complete search history.

(56) References Cited

U.S. PATENT DOCUMENTS

| | | | | |
|---|---|---|---|---|
| 6,411,997 | B1* | 6/2002 | Dawes et al. | 709/224 |
| 2002/0143935 | A1* | 10/2002 | Schenkel et al. | 709/224 |
| 2004/0083388 | A1* | 4/2004 | Nguyen | 713/201 |
| 2005/0177631 | A1* | 8/2005 | Bahl et al. | 709/224 |
| 2005/0198513 | A1* | 9/2005 | Rodriguez et al. | 713/182 |
| 2006/0218275 | A1* | 9/2006 | Labio et al. | 709/224 |
| 2010/0071024 | A1* | 3/2010 | Eyada | 726/1 |
| 2010/0305990 | A1* | 12/2010 | Tyree et al. | 705/7 |

OTHER PUBLICATIONS

A hybrid mechanism for resource/service discovery in ad-hoc grids by Rafael Moreno-Vozmediano; Publisher: Elsevier; Date: Mar. 4, 2008.*
Magoutis, K., et al. Galapagos: Model-Driven Discovery of End-To-End Application-Storage Relationships in Distributed Systems. IBM J. Research and Development. vol. 52, No. 4/5. Jul./Sep. 2008. pp. 367-377.

* cited by examiner

*Primary Examiner* — Madhuri Herzog
(74) *Attorney, Agent, or Firm* — Tutunjian & Bitetto, P.C.; Louis J. Percello (57) ABSTRACT

A system and method for discovering security classifications of network areas includes representing actually allowed network flows and flows permitted by a security policy in a format that enables comparison. The actually allowed network flows and the security policy are provided in a networked computing environment including network areas, wherein each network area is a collection of one or more computing and network devices, and enterprise security policy defines security requirements for security classifications. An assignment of security classifications to network areas is determined by comparing the actually allowed network flows with the flows permitted by the security policy.

25 Claims, 6 Drawing Sheets

SYSTEM AND METHOD FOR AUTOMATICALLY DISCOVERING SECURITY CLASSIFICATION OF HOSTS

BACKGROUND

1. Technical Field

The present invention relates to security zone maintenance and, more particularly to systems and methods for automatically discovering security zone information in enterprise networks.

2. Description of the Related Art

A security zone is a defined area encompassed by boundary firewalls. Each security zone belongs to a classification. A classification is associated with security requirements. Security requirements may include, e.g., permitted communications of hosts residing in a zone with a particular classification, requirements on secure storage, etc. The requirements for all classifications are typically defined in enterprise security policy, which varies from enterprise to enterprise.

A common classification consists of three network environments:

Intranet: The intranet is a trusted network environment for storing confidential data and for hosting systems and services internal to the enterprise.

Extranet: The extranet is a buffer zone between systems and services internal to the enterprise and those that are external to the enterprise.

Opennet: The opennet is an untrusted network environment (e.g., the Internet) that includes all systems external to the enterprise.

While most enterprises only have a handful of classifications there may be a large number of security zones for each classification. The reason is that security zones are not created solely for security purposes. Organizational, geographical, and functional factors also drive the creation of security zones. Geographically distinct areas are usually placed in different security zones. Even within the same location, different organizational divisions may create and govern their own security zones. Within the same division, different business applications may be placed within their own zones. Further, the development version of a business application and the production version would be placed in separate zones. As a result, many enterprises have a sprawl of security zones.

Obtaining an inventory of security zones in an enterprise involves obtaining information about what security zones exist in the network, what their classification is, and which hosts belong to them. Such an inventory is needed in many situations. E.g., in server consolidation and virtualization activities, servers have to be migrated from a source environment to a target environment, and communication controls between servers belonging to different zones have to be reproduced in the target environment.

When migrating a storage system from a development zone to a production zone, information about security zones is needed to estimate costs involving firewall reconfiguration. Storage systems in the same security zone classification can be consolidated without extra effort in security configuration. The network infrastructure of an enterprise may need to be rearranged to optimize performance or reduce maintenance costs. During this process, an inventory of security zones is needed to avoid disruption of security compliance of the whole system. Information about security zones is also needed to analyze the end-to-end data flow across the enterprise network, to deter mine whether the right controls and filters are in place, and for compliance and audit purposes.

An inventory is simply absent in many enterprises, let alone having an up-to-date one. Typically, when there is a need for such information, it is obtained by contacting network administrators who are in charge of maintaining individual zones and network devices. This way of collecting information is very unreliable and the obtained information is often outdated. It is not uncommon that for some zones, no one has this information (e.g., the original administrator may have moved on to a different role or a company). Hence, there is a clear need to obtain up-to-date security zone information in an automated way.

SUMMARY

A method for discovering security classifications of network areas includes representing actually allowed network flows and flows permitted by a security policy in a format that enables comparison, wherein the actually allowed network flows and the security policy are provided in a networked computing environment including network areas, wherein each network area is a collection of one or more computing and/or network devices, and enterprise security policy defines security requirements for security classifications; and the determination of an assignment of security classifications to network areas is performed by comparing the actually allowed network flows with the flows permitted by the security policy. For example, a network area may consist of a one or more hosts, subnets, security zones, or a combination of them.

A method for discovering security classifications of network areas includes representing actually allowed network flows and flows permitted by a security policy in a format that enables comparison by employing a unified framework through feasibility set analysis, wherein the network flows and the security policy are provided in a networked computing environment including network areas, wherein each network area is a collection of one or more computing and network devices, and enterprise security policy defines the security requirements for security classifications; and determining an assignment of security classifications to network areas by comparing the actually allowed network flows with the flows permitted by the security policy to discover the security classifications of the networks areas by employing an elimination-based inferencing method to eliminate feasible sets of security classifications from consideration and arrive at the security classification for each network area.

A system for automatically discovering security classifications includes a processing device configured to format at least one of actually allowed network flows and flows permitted by a security policy to enable a comparison therebetween. The processing device is further configured to compare the actually allowed network flows and the flows permitted by the security policy, wherein the actually allowed network flows and the flows permitted by the security policy occur between network areas, and wherein each network area is a collection of one or more computing and network devices. The network areas are part of a networked computing environment, and security classifications are defined by a security policy. A program method is stored in memory and configured to exclude an assignment of security classifications to network areas if an actually allowed network flow is not compliant with the flows permitted by the security policy.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles provide for an automated discovery of security zones by comparing enterprise security policy with observed connectivity as given by a network configuration, network statistics, and/or application behaviors. An elimination-based inference methodology in accordance with the present embodiment excludes a potential host classification if the observed connectivity of the host with other hosts would contradict the security policy, hence, using what is already known about the other hosts' potential classifications.

The present embodiments provide an automated way of discovering security zone information. There are a number of collection techniques for network information, e.g., connectivity probing, obtaining routing table information, application connectivity logs, and firewall configuration analysis; however, none of these give direct information about security zones. The inference method can make use of such information to derive security zones. In preferred embodiments, the discovery process involves collection and analysis of network configuration information in a staged or incremental fashion. Each stage includes an information collection phase and an analysis phase. In each analysis phase, the elimination-based inference method is executed. Eventually, with sufficient information, the method will place each host or node in a unique classification.

Going from one stage to the next, the information collection technique has a higher overhead (e.g., in terms of credentials or intrusiveness), but also yields higher quality information. The initial information collection stage has minimal overhead, and the analysis of that stage can be used to intelligently guide the information collection in the next stage. Intelligent guidance, for example, can mean reducing the number of nodes on which the collection phase of the next stage has to be deployed. This staged approach enables the deployment of certain high-overhead information collection techniques that would have been otherwise prohibitive.

In one embodiment, a specific sequence of collection techniques to be used makes the overall process services friendly, i.e., easy to use by an internal or external service provider that does not have privileged access to the network and its machines. No special network software or agents are needed to be present on individual hosts for the illustrative examples described. However, network software and agents may be employed in accordance with the present teachings. Only those network tools that are normally part of standard operating systems are leveraged to obtain network configuration. Next, the information collection techniques follows a deployment-free methodology by using simple scripts that are directly executed by the system administrators, without the need for installing agents or obtaining special credentials. In this regard, this specific collection technique for network information has similarities to other script-based discovery techniques, but it collects other information, among other things. It should be understood that the present principles are not limited to deployment-free solutions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
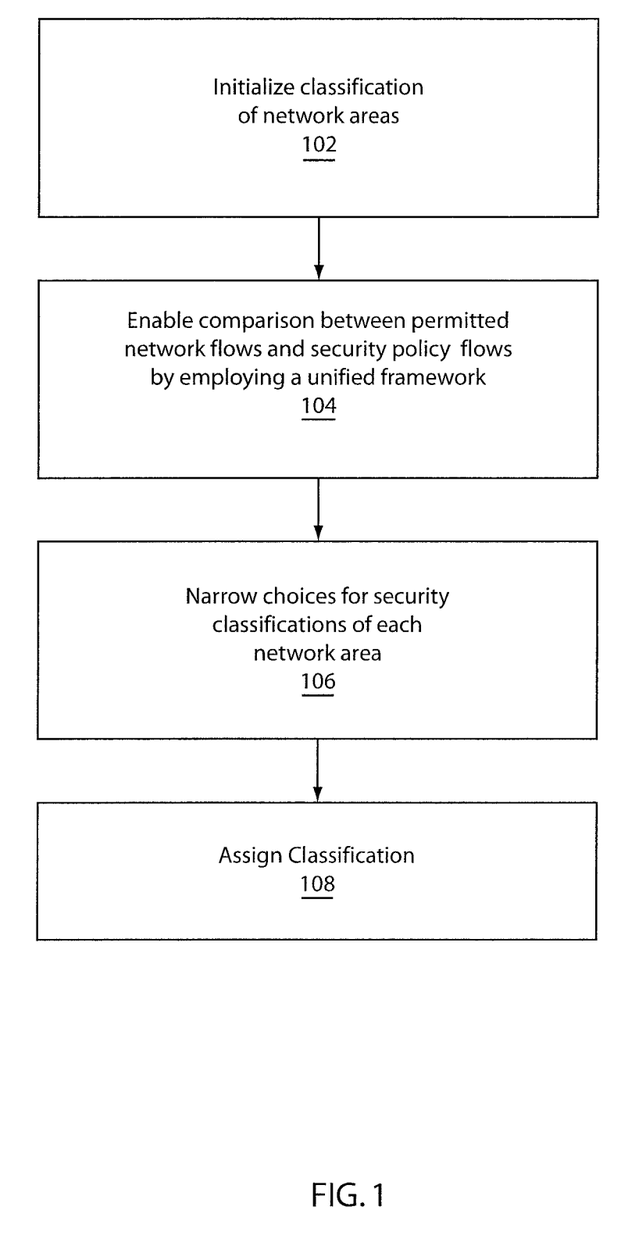
FIG. 1 is a high-level flow diagram showing an illustrative implementation of an elimination-based inference method that derives security zone information by comparing enterprise security policy with information about actually allowed network flows in accordance with one embodiment.

Referring now to the drawings in which like numerals represent the same or similar elements and initially to FIG. 1, a high-level flow diagram shows an illustrative implementation of an elimination-based inference method that derives the security zone information by comparing enterprise security policy with information about actually allowed network flows. The inference method works as follows: In block 102, each network area with unknown security zone classification is assigned all possible colors (colors will be employed throughout this disclosure to generically designate classifications). For example, security zones belonging to the intranet may be referred to as blue zones, security zones belonging to extranets may be referred to as yellow zones, and security zones belonging to opennets may be referred to as red zones. A network area includes a set of computing devices that are known to have a same security classification. This prior knowledge might come from various sources, in particular: —the network addresses of the computing devices (if the devices are in a same subnet, they necessarily have the same security classification (at least in almost all security policies)); —knowledge of the network topology, e.g., if a certain data center only has firewalls at its boundaries but not internally, all the computing devices in this data center can be treated as belonging to the same network area; —partial knowledge from the administrators or documentation, etc.

In block 104, to enable the comparison, security policies and actually allowed network flows are represented in a unified manner. This may include the use of feasibility sets. The inference method successively narrows down choices for potential colors for a network area if the actually allowed network flows between that network area and others would contradict the security policy for those colors, in block 106. A classification is output in block 108.

In accordance with the present principles, a system and method for discovering security zone information in enterprise networks is automated to obtain the security zone information. In preferred embodiments, a discovery process involves collection and analysis of network configuration information in a staged or incremental fashion. Each stage consists of an information collection phase and an analysis phase. The information collection phase may leverage one or more already existing tools, e.g., approaches based on observation (using both active methods such as probing connectivity between two hosts and passive methods such as sniffing), collecting and analyzing the configuration of network devices (such as firewalls), hosts, and applications running on the hosts, as well as network statistics. As part of each analysis phase, the elimination-based inference method may be executed. However, other analysis not involving this method may also be performed. Given sufficient input information about policy and configuration, the method will place each host in a unique classification.

An assumption underlying the present approach is that the actual network flows of security zones are a subset of the network flows allowed by enterprise security policy. If this assumption cannot be satisfied, then the problem at hand is no longer discovery of security zones but one of compliance verification, which can also be provided in accordance with the present principles.

In one embodiment, a unified framework may employ feasibility sets although other frameworks may be employed. A feasibility set $F_{a_i \to a_j} = \{x | f_{ij}(x)\}$ is used to denote the permitted traffic flows from one network area $a_i$ to another $a_j$. In an illustrative example, x is a packet and the predicate $f_{ij}(x)$ is defined over the fields of x. The use of a packet and in particular an IP packet and choice of fields are made for illustrative purposes only. Other packets, fields and frameworks are also contemplated in accordance with the present principles. A field y of packet x is denoted by x.y. The predicate may include regular expression matches, denoted by ≅. Packet fields that are considered include source IP address, source port, destination IP address, destination port, and protocol type. For example, if $f_{ij}(\cdot)$=true, then all flows are allowed from $a_i$ to $a_j$. If $f_{ij}(\cdot)$=false, then no flow is allowed from $a_i$ to $a_j$.

Feasibility sets may be used for representing both connectivity information collected and enterprise security policies. Network configurations such as connections observed and firewall filtering rules lend themselves to expression through feasibility sets. We have implemented analyzers for parsing through network configurations from individual hosts and firewall configuration files, and extracting the corresponding feasibility sets from the configuration. Network administrators may implement the security policy in different ways, and the implemented configurations can be described as feasibility sets. A network administrator might configure actually allowed network flows to be different subsets of the network flows permitted by the security policy.

Example 1

$$F_{a_i \to a_j} = \{x | x.\text{IP.Protocol}=6 \wedge x.\text{TCP.DstPort}=80) \vee (x.\text{IP.SourceAddr} \cong 9.*.*.*)\}$$

The feasibility set specifies that all TCP (i.e., LP protocol 6) packets addressed to the HTTP port (80), and all packets originating from an IBM intranet are allowed from $a_i$ to $a_j$.

tication exists when a system or user can prove knowledge of a secret (such as a password or private key) without it being observed or revealed. In this case, the feasibility set for traffic reaching a blue zone $a_j$ from any yellow zone a may consist of, e.g.:

TCP traffic (i.e., IP Protocol 6) to ports 22 (SSH), 25 (SMTP), 389 (LDAP), 443 (HTTPS), 636 (LDAPS), 989 (FTPS data), 990 (FTPS control), 992 (telnet protocol over SSL/TLS), 993 (IMAPS), or 995 (POP3S), UDP traffic (i.e., IP Protocol 17) to port 500 (IPSec—Internet Key Exchange), and IPSec traffic (i.e., IP Protocols 50 and 51). Thus, in this example, a feasibility set can be expressed as:

$$F_{a_i \to a_j} = \{x | (x.\text{IP.Protocol}=6 \wedge x.\text{TCP.DstPort}$$

$$\in \{22,25,389,443,636,989,990,992,993,995\})$$

$$\vee (x.\text{IP.Protocol}=17 \wedge x.\text{TCP.DstPort} \in \{500\})$$

$$\vee (x.\text{IP.Protocol} \in \{50,51\})\}.$$

Other strong authentication protocols may also be added to this feasibility set. The example feasibility set incorporates common strongly authenticated traffic, assuming the traffic flows through standard ports.

A zone inferencing method is described in greater detail in accordance with an illustrative embodiment. A method or program called COLOR (C,A,P,N) assigns colors (i.e., classifications) to network areas through elimination-based inferences. Let $A=(a_1, a_2, \ldots a_n)$ be the list of network areas.

Method COLOR (C;A;P;N)

```
repeat
    color_eliminated ← false    {indicates whether any color was eliminated in this iteration}
    foreach network area a_i ∈ A that has |c_i| > 1 do
        foreach color α ∈ c_i do
            foreach network area a_j ∈ A, where i ≠ j, do
                α_possible ← false    {indicates whether α is a possible color for a_i}
                foreach color β in c_j do
                    if N(a_i,a_j) ⊆ P(α,β) ^ N(a_j,a_i) ⊆ P(β,α) then
                        α_possible ← true
                if α_possible = false then
                    c_i ← c_i − α
                    color_eliminated ← true
until color_eliminated = false
```

Example 2

A firewall may be configured to allow only secure shell (SSH) and Hypertext Transfer Protocol Secure (HTTPS) traffic to any host in the network area $a_j$. In this case, the feasibility set for traffic reaching $a_j$ from any network area $a_i$, where i≠j is expressed as: $F_{a_i \to a_j} = \{x | x.\text{IP.Protocol}=6 \wedge x.\text{TCP.DstPort} \in \{22,443\}\}$.

Enterprise security policies are usually documented in natural language or in a format that is intuitive to a human operator. The policy guides network, security, and system administrators to construct and maintain the infrastructure that complies with the security goal. Manual effort is needed to transform these policies into feasibility sets. However, since enterprise security policies are relatively static, the translation is a one-time effort.

Example 3

Enterprise security policies only allow strongly authenticated traffic from a yellow zone to a blue zone. Strong authen- For a given invocation of the method, n is fixed. However, the number of network areas can vary between successive invocations of the method. Let $C=(c_1, c_2 \ldots c)$, where $c_i$ is the set of possible colors for area $a_i$. The values of $c_i$ are drawn from a domain D of colors. For example, D={Blue, Green, Red, Yellow}. If $a_i$'s color is known a priori, then $c_i$ is initialized with the set containing only that value. Otherwise, $c_i$ is initialized with all values in D. The set A should include at least two elements that belong to different colors, and whose colors are known in advance. The elements serve as the baseline for comparison. This requirement is expressed by the predicate, $$Q(C,A) = \exists 1 \leq i,j \leq n, \text{ such that } i \neq j \text{ and }$$

$$|c_i|=1 \text{ and } |c_j|=1 \text{ and } c_i \cap c_j = \emptyset$$

Let $N(a_i, a_j)$ as shown in the Method be the feasibility set of actually allowed network flows from area $a_i$ to $a_j$ as observed through various information collection approaches. Let P(c, d) be the feasibility set of packets from an area of color c to another of color d that are allowed by the security policy.

The inferencing is based on the assumption that the feasibility set of (discovered or actually allows) network configurations should be a subset of (enterprise) security policy. During each iteration, a color $\alpha \in c_i$ is allowed to exist as a possible color for network area $a_i$ if there is at least one color $\beta \in c_j$, such that the feasibility set of actually allowed packets between areas $a_i$ and $a_j$ is a subset of the feasibility set for the colors $\alpha$ and $\beta$. Otherwise, $\alpha$ is eliminated from the list of possible colors for $a_i$. The method iterates until no color elimination is possible.

Method COLOR (C,A,P,N) may be invoked multiple times during the course of a staged discovery process. Specifically, it may be invoked at most once during an analysis phase of each stage; at most once, because other types of analysis not involving the method may be performed. For example, hosts that belong to the same subnet may be identified and aggregated into one network area. Similarly, two network areas that are observed to have unconstrained connectivity between them may be merged into one network area. Similarly, new network areas of interest may be revealed by analyzing new connection logs. Such analysis may alter the sequences A and C, and thus N, between successive invocations of Method COLOR (C,A,P,N).

If two network areas $a_i$ and $a_j$ are being merged, then A will be changed to the result of performing the sequence operations, A=A.remove($a_i$), A=A.remove($a_j$), A=A.append($a_k$). Also, set C will be changed to the result of performing the sequence operations, C=C.remove($c_i$), C=C.remove($c_j$), C=C.append($c_k$). Here, the color of the merged network area $a_k$ is given by $c_k = c_i \cap c_j$.

The feasibility sets for $a_k$ with respect to another network area $a_l$ are given by:

$$F_{a_k \to a_l} = F_{a_i \to a_l} \cup F_{a_j \to a_l} = \{x | f_{il}(x) \vee f_{jl}(x)\}$$

$$F_{a_l \to a_k} = F_{a_l \to a_i} \cup F_{a_l \to a_j} = \{x | f_{li}(x) \vee f_{lj}(x)\}$$

This process of information collection followed by running the inference method may be repeated until each network area has a unique color assignment. However, Method COLOR (C,A,P,N) may not be able to shrink the set of possible colors for each network area if the information is insufficient.

Complexity of Method COLOR (C,A,P,N): The complexity of a single execution of Method COLOR (C,A,P,N) is now analyzed. The worst-case running time of Method COLOR (C,A,P,N) is determined by (i) the maximum number of times the set comparison in line 8 of the Method is executed, and (ii) the worst-case cost of that comparison.

There are two set comparison operations in line 8 of the Method. Let f and f' represent the predicates that define the feasibility sets F and F' respectively. Then, checking whether the $F \subseteq F'$ is equivalent to checking that the Boolean expression f→f' (i.e., f implies f') holds. Let k be the maximum number of clauses in the predicate defining $N(a_i, a_j)$ or $P(c_i, c_j)$ for any $1 \le i, j \le j$. Then the worst case complexity of evaluating the Boolean expression f→f' is linear in k.

Let c=|D| be the maximum number of colors that can be initially assigned to any network area. To begin with, each of the n network areas may be assigned all of the c colors. In the worst-case, only one color is eliminated in each iteration of the outermost repeat loop (line 1) and the iterations continue until each network area is assigned a unique color. Thus, there may be a maximum of (n−1)c iterations of the outermost repeat loop. In each iteration of the outermost repeat loop, line 8 is executed at most $n^2 c^2$ times. Thus, the worst-case running time of Method COLOR (C,A,P,N) is $n^2 c^2 \cdot (n-1) c \cdot 2 k$. Thus, the worst-case complexity of Method COLOR (C,A,P,N) can be expressed as $O(n^3 c^3 k)$. c is a small constant. For a large company, c=6; for small and medium enterprises, c is about 3.

The comparison in line 8 of Method COLOR (C,A,P,N) considers only two network areas at a time. This may result in certain possible color eliminations being overlooked by Method COLOR (C,A,P,N). To address this issue, a finite-domain constraint satisfaction problem (CSP) is formulated. As one example, it can be then solved using a general-purpose CSP solver.

Variables: $(c_1, c_2 \ldots c_n)$
Domain: C
Constraints: $N(a_i, a_j) \subseteq P(c_i, c_j)$, where $1 \le i, k \le n$ A complete assignment to a CSP is defined as one in which every variable is mentioned, and a solution to a CSP is a complete assignment that satisfies all the constraints. For the above CSP, the domain of each variable $c_i$ is C, and the number of possible complete assignments is c which is exponential in the number of variables. Since the worst-case complexity of Method COLOR (C,A,P,N) is a much smaller $O(n^3 c^3 f)$, it is typically much more efficient to first run Method COLOR (C,A,P,N) and use the output of the method to narrow down the domain of some of the variables $c_i$. Essentially, each color elimination done by Method COLOR (C,A,P,N) adds a unary constraint to the CSP that restricts the value of a single variable (say, $c_i$). This constraint can be removed by the CSP solver simply by shrinking the domain of $c_i$ to remove any value that violates the constraint.

Figure 2:
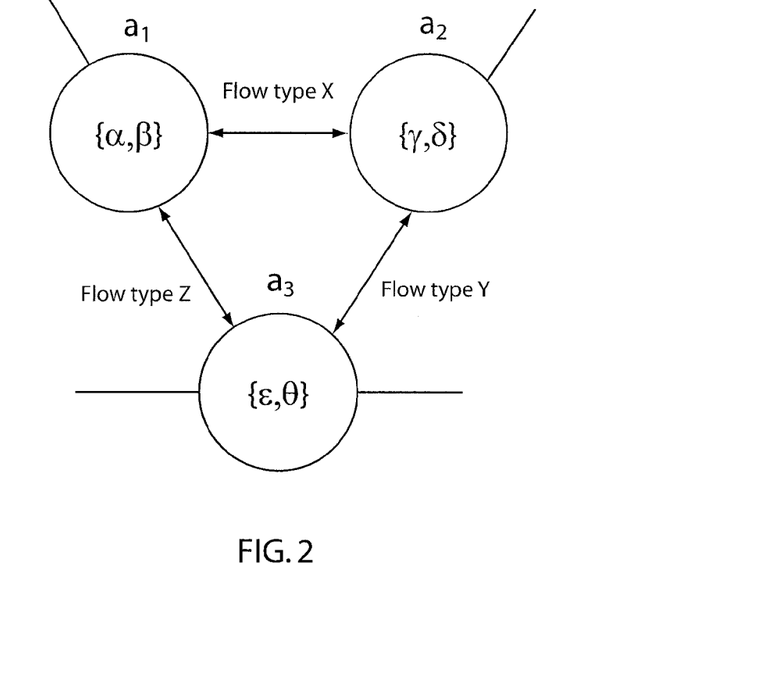
FIG. 2 is a diagram showing an output of an inferencing method in accordance with the present principles.

Referring to FIG. 2, an example considering a situation after running Method COLOR (C, A, P, N) is illustratively depicted. Here, a domain C of colors is $\{\alpha, \beta, \gamma, \delta, \epsilon, \theta\}$ and a subsection 200 of a network topology is shown highlighting three areas $a_1, a_2,$ and $a_3$ among the n network areas. Edges are labeled with the types of network flows observed between each pair of nodes. For example, Flow Type X was observed between $a_1$ and $a_2$, Flow Type Y was observed between $a_2$ and $a_3$, and Flow Type Z was observed between $a_1$ and $a_3$. According to the security policy which is expressed as feasibility sets in Table 1, this could mean that $c_1 = \{\alpha, \beta\}$ and $c_2 = \{\gamma, \delta\}$. Method COLOR (C,A,P,N) will not be able to eliminate further colors beyond what is shown in FIG. 2. On the other hand, if the output of the Method were used to initialize the domain values $\{c_i | 1 \le i \le n\}$ and then fed to a CSP solver, then the solver would consider the following six constraints simultaneously:

$\{x | x \in \text{Flow } X\} \subseteq (c_1, c_2)$ $\{x | x \in \text{Flow } X\} \subseteq P(c_2, c_1)$ $\{x \star x \in \text{Flow } Y\} \subseteq P(c_2, c_3)$ $\{x | x \in \text{Flow } Y\} \subseteq P(c_3, c_2)$ $\{x | x \in \text{Flow } Z\} \subseteq P(c_3, c_1)$ $\{x | x \in \text{Flow } Z\} \subseteq P(c_1, c_3)$

TABLE 1

Predicates for Feasibility Sets Representing Security Policy (i.e., P) for Example 4 (FIG. 2). Predicate "Flow X" holds for all packets with characteristics of flow type X.

| | To | | | | | |
|---|---|---|---|---|---|---|
| From | α | β | γ | δ | ε | θ |
| α | true | false | Flow X | Flow X | Flow Z | false |
| β | false | true | Flow X | false | false | Flow Z |

TABLE 1-continued

Predicates for Feasibility Sets Representing Security Policy
(i.e., P) for Example 4 (FIG. 2). Predicate "Flow X"
holds for all packets with characteristics of flow type X.

| From | To | | | | | |
|---|---|---|---|---|---|---|
| | α | β | γ | δ | ε | θ |
| γ | Flow X | Flow X | true | false | Flow Y | false |
| δ | Flow X | false | false | true | false | Flow Y |
| ε | Flow Z | false | Flow Y | false | true | false |
| θ | false | Flow Z | false | Flow Y | false | true |

Figure 3:
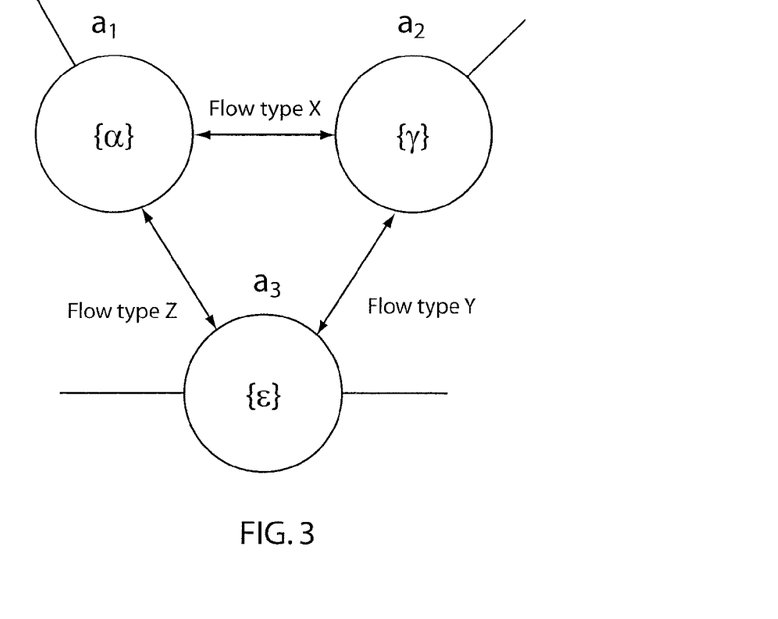
FIG. 3 is a diagram showing further narrowing down of possible choices for the classification of each network area using a solver for the output shown in FIG. 2 in accordance with the present principles.

As a result, the solver would arrive at the solution $\{c_1=\alpha, c_2=\gamma, c_3=\epsilon\}$ (shown in FIG. 3). Note that if only the CSP solver were used (i.e., without first running Method COLOR (C,A,P,N), then a total of $6^3=216$ possible complete assignments would have been considered for the three network areas. However, when the output of the Method is used to initialize the domain values, the number of possible color assignments for the three network areas reduces to $2^3=8$, thereby greatly reducing the search space.

Example Information Collection Approaches: A sample sequence of collection techniques are presented that may be used to make the overall process services friendly, i.e., easy to use by an internal or external service provider that does not have privileged access to the network and its machines. First, no special network software or agents are assumed to be present on individual hosts. Only those network tools that are normally part of standard operating systems are leveraged to obtain network configuration. Next, our information collection techniques follow a deployment-free methodology by using simple scripts that are directly executed by the system administrators, without the need for installing agents or obtaining special credentials. In this regard, this specific collection technique for network information is similar to other script-based discovery techniques, but collects other information as well.

One approach is to collect network configuration and runtime network-related application behavior directly from end hosts (e.g., the netstat command). The approach is realized by exporting and analyzing the configuration files of software systems in the network. It collects information from end hosts without generating any traffic that may disrupt their normal operation.

A second approach is to estimate the network configurations from the end hosts. The approach is realized by probing and analyzing connectivity between end hosts. Probing involves injecting some packets into the network to examine the connectivity (or lack thereof) between hosts. Such probing can be done through applications such as telnet, ftp, and nslookup, which are commonly available on all platforms. It should be noted that injecting packets may raise security concerns, and may thus need the proper advance notification of security administrators.

A third approach is to collect network configurations directly from network devices such as routers and firewalls. The approach involves exporting and analyzing the configuration files in the boundary firewalls and routing tables in the intermediate routers.

The above three approaches constitute one possible sequence that may be used in services engagements. However, as mentioned, there are numerous publicly available tools and techniques for obtaining information about actually allowed network flows, and these may be leveraged as well.

Sequencing Information Collection Approaches for Process Efficiency: While existing information collection approaches are leveraged, the information collection is structured into stages. Going from one stage to the next, the information collection technique has higher overhead (e.g., in terms of credentials or intrusiveness), but also yields higher quality information. An information collection approach that has minimal overhead is initially used, and the analysis of that stage is employed to intelligently guide the information collection in the next stage.

A concrete example will now be described to demonstrate how staged information collection can improve the efficiency of the collection process. Suppose in an initial stage, the netstat command is run on the individual hosts. Analysis of the gathered information helps identify the different subnets (which are one type of network area) present in the environment, and the host IP addresses belonging to each subnet. Since each network area can belong to only one security zone, the next stage of information collection is deployed, namely connectivity probing, at only a subset of hosts per subnet (instead of all hosts). Thus, the interleaving of information collection and analysis can help reduce the number of nodes on which the next stage of information collection has to be deployed. Consequently, the staged approach enables the deployment of certain high-overhead information collection techniques that would have been otherwise prohibitive.

Referring to FIGS. 4A-D, a process of incremental discovery will now be described by way of an example. Table 2 shows the predicates for feasibility sets corresponding to a simplified subset of an enterprise policy with the domain of colors, D={Blue, Green, Yellow, Red} (abbreviated as B, G, Y, R in the FIG. 4). Predicate "Flow X" holds for all packets with characteristics of flow type X. Thus, "Flow Standard Auth" holds for all packets that are part of a standard authentication flow (such as the ftp or telnet protocol). "Flow Strong Auth" holds for all packets that are part of a strong authentication flow (such as the https or ssh protocol).

Figure 4A:
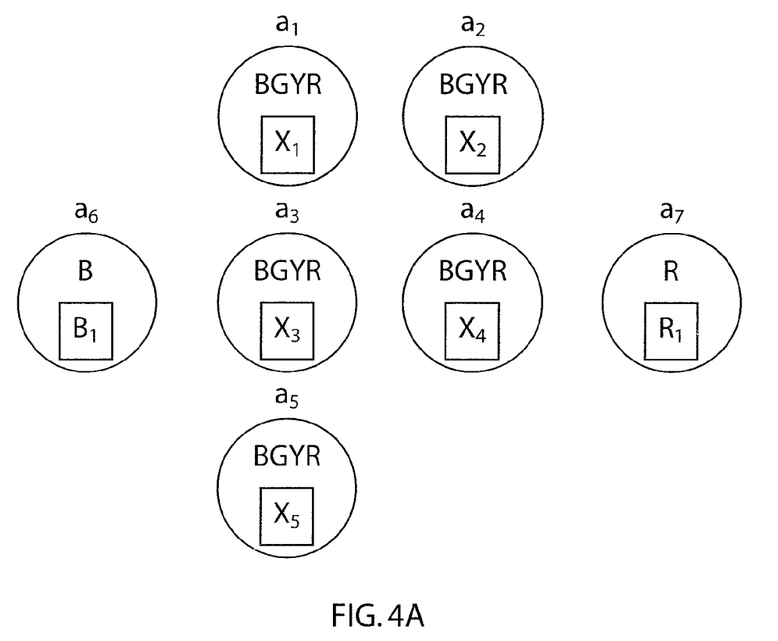
FIGS. 4A-4D are diagrams showing four stages (0-3) for discovering classification of network areas in accordance with one illustrative example.

Stage 0:

FIG. 4A shows the pre-discovery stage in which A= $(a_1, \ldots, a)$ and $C\gamma(c_1, \ldots c_7)$. Here, network area $a_i$={Host $X_i$}, for $1 \leq i \leq 5$, whose color $c_i$ is unknown and therefore initialized to the set D. $a_6$={Host $B_1$} whose color $c_6$={Blue}. $a_7$={Host $R_1$} whose color $c_7$={Red}.

TABLE 2

Predicates for Feasibility Sets Representing Security Policy (i.e., P) for
a Simplified Subset. Predicate "Flow X" holds for all packets
with characteristics of flow type X.

| From\To | Blue | Green | Yellow | Red |
|---|---|---|---|---|
| Blue | true | true | true | true |
| Green | Flow Standard Auth | true | true | true |
| Yellow | Flow Strong Auth | Flow Strong Auth | true | true |
| Red | false | false | true | true |

Figure 4B:
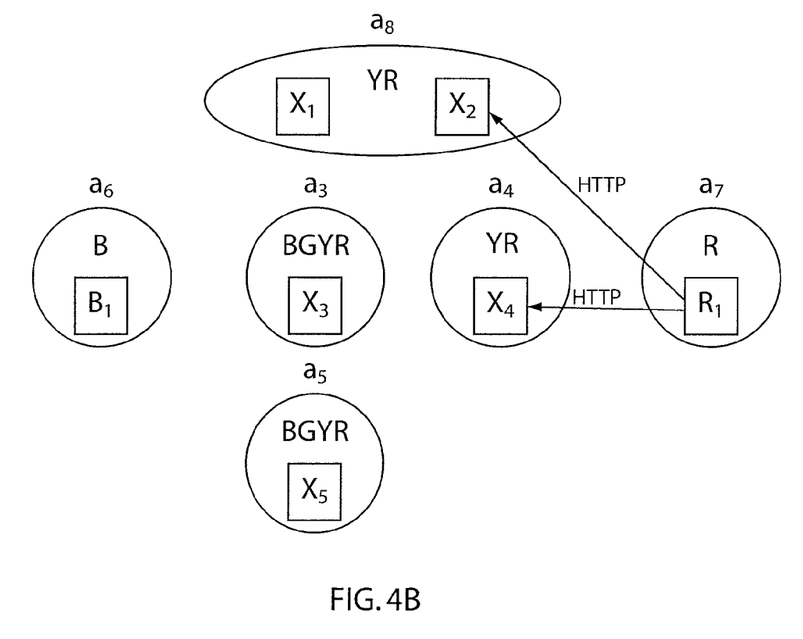

Stage 1:

FIG. 4B shows the first stage discovery of the system, after analysis of netstat files obtained from the individual hosts. The analysis has established that hosts $X_1$ and $X_2$ belong to the same subnet. Consequently, network areas $a_1$ and $a_2$ are merged into a single area $a_8$, whose color $c_8=c_1 \cap c_2$. Thus, $A=(a_3, \ldots, a)$ and C becomes $(c_3, \ldots, c)$. The analysis also reveals the existence of active HTTP connections between hosts $R_1$ and $X_2$ and between $R_1$ and $X_4$; the feasibility sets N will be accordingly updated before invoking Method COLOR (C,A,P,N). When the Method completes execution, $c_4$ will be reduced to the set {Yellow, Red}, and $c_8$ to the set {Yellow}.

Figure 4C:
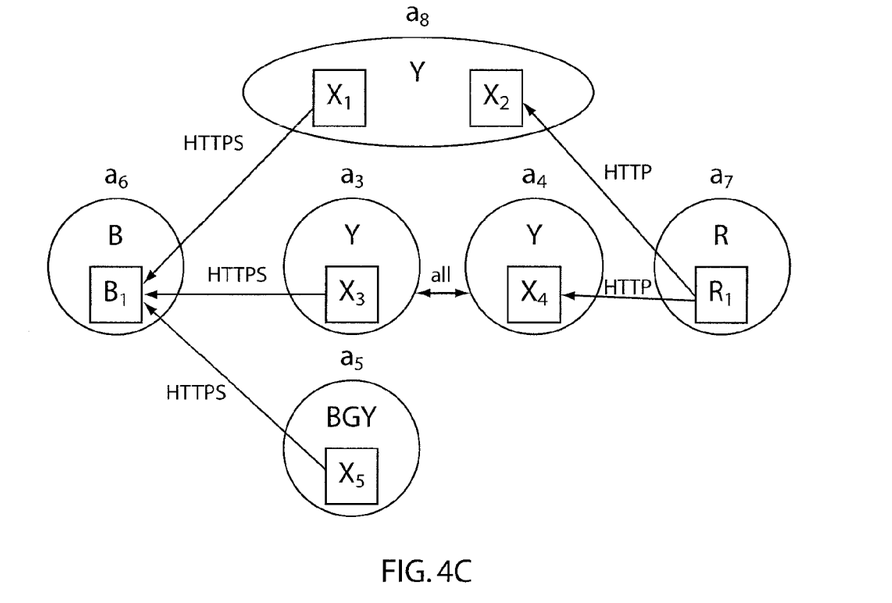

Stage 2:

FIG. 4C shows the second stage discovery of the system, after active probing and analyzing connectivity between hosts. The analysis has established that (i) hosts $X_1$, $X_3$, and $X_5$ can communicate with host $B_1$ using the HTTPS protocol (i.e., strong authentication), and (ii) all traffic is allowed between hosts $X_3$ and $X_4$. The feasibility sets N will be accordingly updated before invoking Method COLOR (C, A, P, N). When the Method completes execution, $c_3$, $c_4$, and $c_8$ will be reduced to the set {Yellow}.

Figure 4D:
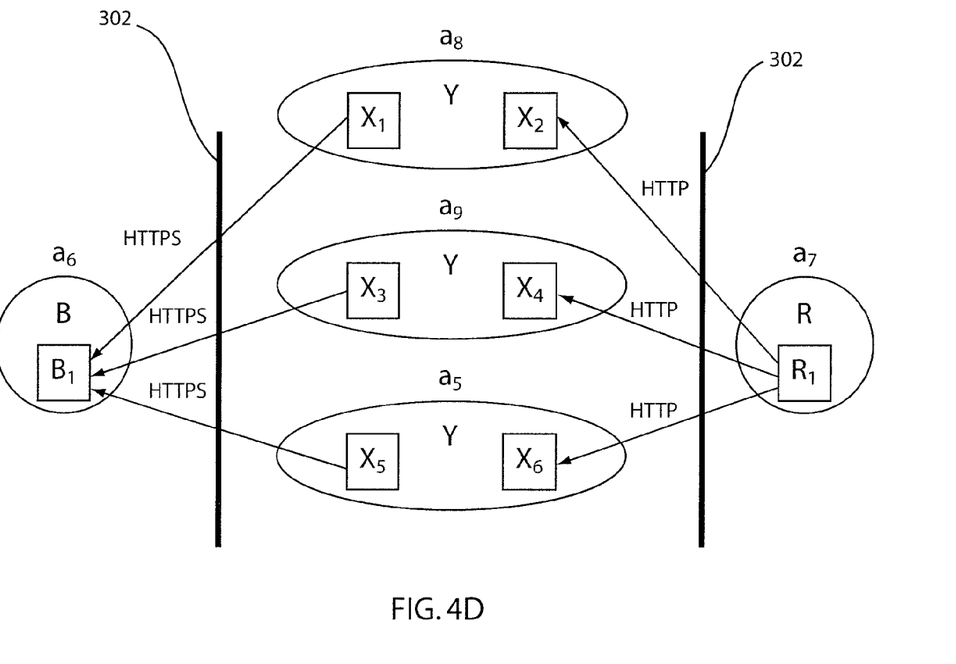

Stage 3:

FIG. 4D shows the third stage discovery of the system, in which firewall locations 302 are identified and their configuration files analyzed. The analysis reveals that there is no firewall separating the traffic between $X_3$ and $X_4$. Consequently, network areas $a_3$ and $a_4$ are merged into a single area $a_9$, whose color $c_9$={Yellow}. Thus, $A=(a_5, \ldots, a_9)$ and C becomes $(c_5, \ldots, c_9)$). Further, the firewall configuration analysis reveals that HTTP traffic is allowed from $R_1$ to host $X_6$ that is in the same subnet as host $X_5$. Consequently, network area $a_5$ is expanded to the set {Host $X_5, X_6$}. The feasibility sets N will be accordingly updated before invoking Method COLOR (C, A, P, N). When the Method completes execution, $c_5$ will be reduced to the set {Yellow}.

Figure 5:
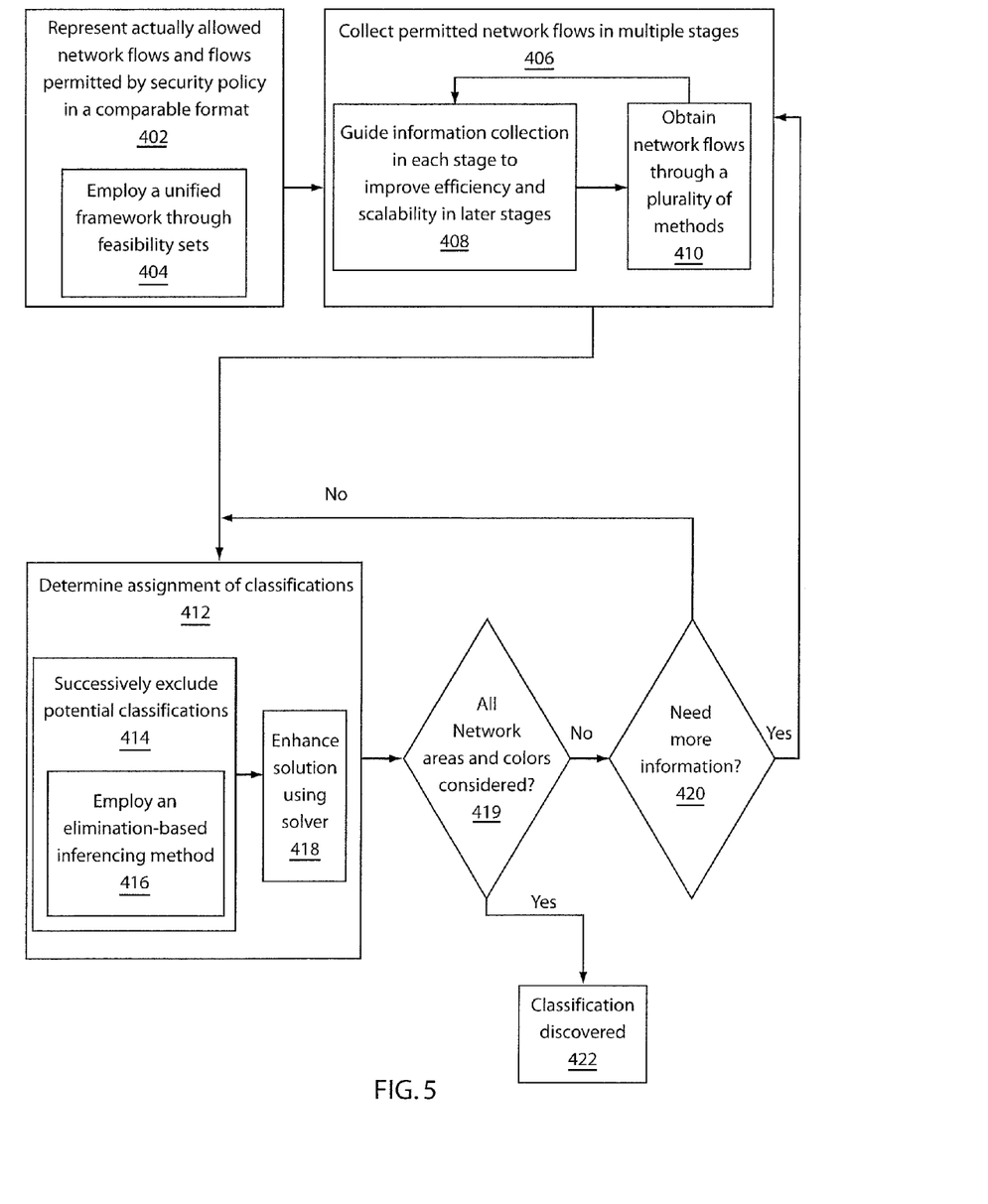
FIG. 5 is a block/flow diagram showing a system/method for discovering classification of network areas in accordance with the present principles.

Referring to FIG. 5, a block/flow diagram illustrative shows a system/method for discovering security classifications of network areas. In block 402, actually allowed network flows and flows permitted by a security policy are represented in a format that enables comparison. This preferably includes employing a unified framework through feasibility sets in block 404.

In block 406, the permitted network flows are collected in multiple stages, such that after each stage, analysis is performed, in block 408, to guide the information collection in a next stage to improve efficiency and scalability of information collection in later stages than if all the stages were concurrently executed.

The network flows and the security policy are provided in a networked computing environment including network areas. Each network area is a collection of one or more computing and network devices, and an enterprise security policy defines the security requirements for the various security classifications. The actually allowed network flows may be obtained by a plurality of methods in block 410. These may include obtaining information about the allowed network flows manually (e.g., using a questionnaire, a database record, etc.); by analyzing configuration information on one of computing devices and network devices (e.g., servers), by analyzing configuration information on security devices (e.g., firewalls), by analyzing responses or non-responses to sending packets between network areas (e.g., routers), by sniffing, by analyzing logs, etc. Information may be derived from system configuration analysis, routing tables: subnets and groups in the same zone, active connections: app behaviours, connectivity probing, probing with existing app (deployment-free shell script), Ping: ICMP echo access info, Telnet: TCP (any port) access info, Nslookup: UDP (any port) access info, firewall configuration analysis, parsing Cisco PIX firewall configuration files to find the permitted connections, etc.

In block 412, an assignment of security classifications to network areas is determined by comparing the actually allowed network flow with the flows permitted by the security policy to discover the security classifications of the networks areas. This preferably includes successively excluding potential classifications for a network area from an initial assignment of classifications if the actually allowed network flows between that network area and other network areas contradicts the security policy for the potential classifications in block 414. In block 416, an elimination-based inferencing method is preferably employed to eliminate sets of security classifications from consideration.

In block 418, a solution may be enhanced by solving a constraint satisfaction problem, employing a solver tool, which is formulated by representing the security classification of network areas as variables to be solved, and a requirement that actually allowed network flows between network areas be compliant with the flows permitted by the security policy as constraints. It should be noted that each block in blocks 406 and 412 may be iterated to converge to a solution. In addition, blocks 406 and 412 may be iterated to cover incremental/staged discovery and analysis of a network area or network areas. In block 419, a check may be done to determine if more network areas exist that need to be analyzed and/or whether any hosts need a color assignment. If no, the path goes to block 422. If yes, a check is made to determine if more information is needed in block 420. If more information is needed the path returns to block 406 to collect more information. If more information is not needed the path returned to block 412. In block 422, classifications for network areas are identified and known.

Figure 6:
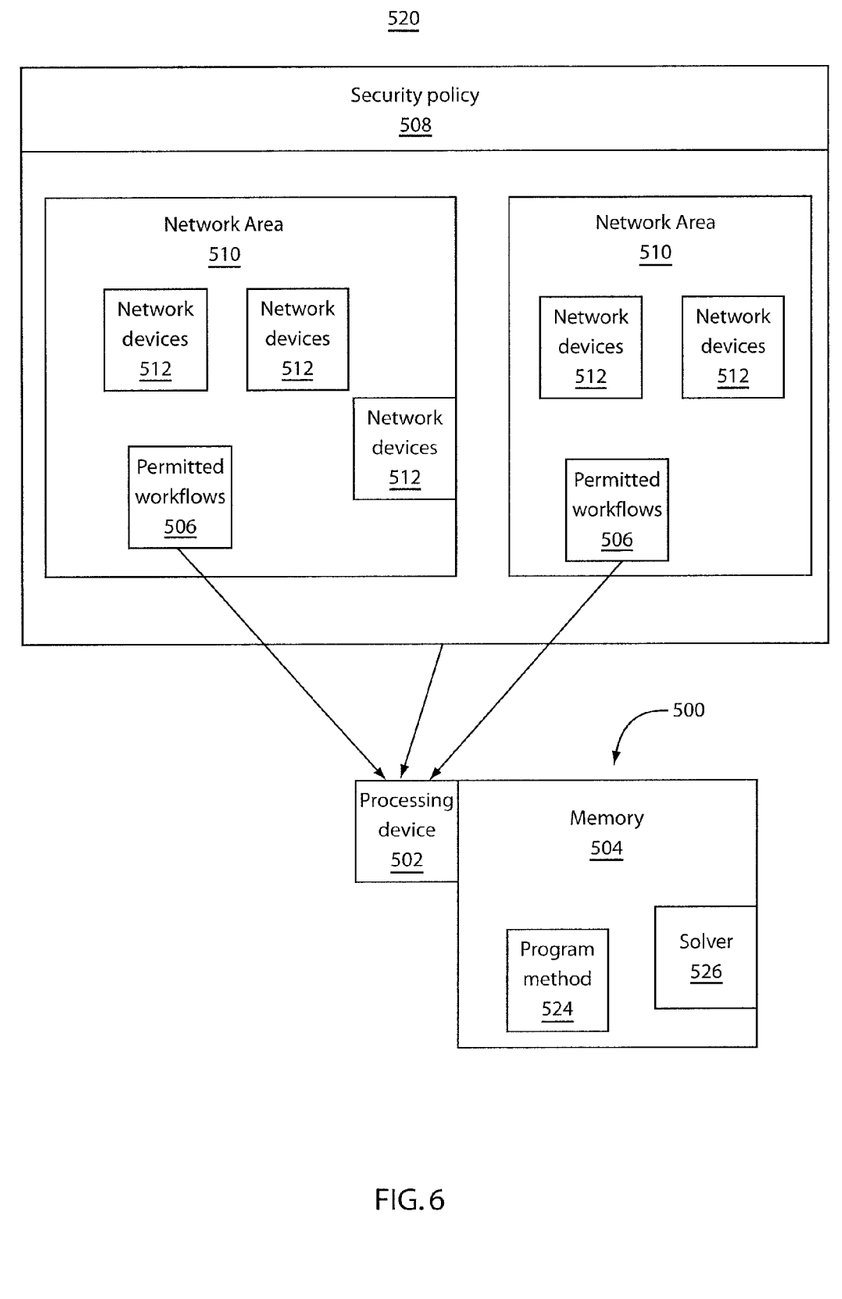
FIG. 6 is a block diagram showing a system for discovering classification of network areas in accordance with the present principles.

Referring to FIG. 6, a system 500 for automatically discovering security classifications is illustratively depicted. A processing device 502 is configured to format permitted network flows and flows permitted by a security policy to enable a comparison therebetween. The processing device 502 is connected to and works in conjunction with memory storage 504. The processing device 502 include a plurality of computer process (which may be co-located or distributed) of be a single processor. The processing device 502 is further configured to compare permitted network flows 506 and flows permitted by a security policy 508. The permitted network flows 506 and the flows permitted by the security policy 508 are included in network areas 510. Each network area 510 is a collection of one or more computing and network devices 512 (e.g., servers, routers, firewalls, etc.). The network areas 510 are part of a networked computing environment 520. The network areas 510 include one or more security zones 522, and security classifications are defined by a security policy 508 in the zones.

A program method 524 (e.g., Method Color) is stored in memory 504 and configured to exclude an assignment of security classifications to network areas if an actually permitted network flow is not compliant with the flows permitted by the security policy. The program method 524 successively excludes potential classifications for a network area from an initial assignment of classifications if the pen fitted network flows between that network area and other network areas contradict the security policy for the assignment of classifications.

A solver tool 526 is configured to solve a constraint satisfaction problem, which is formulated by representing a security classification of the network areas as variables to be solved, and a requirement that permitted network flows between network areas to be compliant with the flows permitted by the security policy as constraints. The information about the permitted network flows is obtained by one or more of a manual process, configuration information on computing devices, configuration information on network devices, configuration information on security devices, and responses or non-responses to sending packets between network areas. The permitted network flows are obtained in multiple stages, such that after each stage, analysis is performed to guide the information collection in a next stage to improve efficiency and scalability of information collection in later stages than if all the stages were concurrently executed.

Having described preferred embodiments of a system and method for automatically discovering security zone classification of hosts (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method performed by a computer for discovering security classifications of network areas, comprising:
representing actually allowed network flows and flows permitted by a security policy in a format that enables comparison, wherein the actually allowed network flows and the security policy are provided in a networked computing environment including network areas, wherein each network area is a collection of one or more computing and network devices, and enterprise security policy defines security requirements for security classifications;
collecting information on the actually allowed network flows in multiple stages, wherein the information collecting at a next stage is deployed at only fewer network devices than a previous stage for incrementally determining relationships between hosts of each actually allowed network flow; and
discovering security zone classifications of each network area by comparing the information on the actually allowed network flows with the flows permitted by the security policy.

2. The method as recited in claim 1 wherein the step of discovering includes successively excluding potential classifications for a network area from an initial assignment of classifications if the actually allowed network flows between that network area and other network areas contradicts the security policy for the potential classifications.

3. The method as recited in claim 1, further comprising solving a constraint satisfaction problem, employing a solver tool, which is formulated by representing the security zone classifications of network areas as variables to be solved, and a requirement that the actually allowed network flows between network areas be compliant with the flows permitted by the security policy as constraints.

4. The method as recited in claim 1, further comprising obtaining information about the actually allowed network flows manually using at least one of a questionnaire and a database record.

5. The method as recited in claim 1, further comprising obtaining information about the actually allowed network flows by analyzing at least one of configuration information and logs on at least one of computing devices and network devices.

6. The method as recited in claim 1, further comprising obtaining information about the actually allowed network flows by analyzing at least one of configuration information and logs on security devices.

7. The method as recited in claim 1, further comprising obtaining information about the actually allowed network flows by at least one of sniffing packets and analyzing responses or non-responses to sending packets between network areas.

8. The method as recited in claim 1, wherein the step of collecting the actually allowed network flows in multiple stages is such that after each stage, analysis is performed to guide the collecting in a next stage to improve efficiency and scalability of information collection in later stages than if all the stages were concurrently executed.

9. The method as recited in claim 1, wherein representing includes employing a unified framework through feasibility sets.

10. The method as recited in claim 9, wherein the step of discovering security zone classifications includes employing an elimination-based inferencing method to eliminate sets of security zone classifications from consideration.

11. A computer readable storage device comprising a computer readable program for discovering security classifications of network areas, wherein the computer readable program when executed on a computer causes the computer to perform the steps of:
representing actually allowed network flows and flows permitted by a security policy in a format that enables comparison, wherein the network flows and the security policy are provided in a networked computing environment including network areas, wherein each network area is a collection of one or more computing and network devices, and enterprise security policy defines security requirements for security classifications;
collecting information on the actually allowed network flows in multiple stages, wherein the information collecting at a next stage is deployed at only fewer network devices than a previous stage for incrementally determining relationships between hosts of each actually allowed network flow;
discovering security zone classifications of each network area by comparing the information on the actually allowed network flows with the flows permitted by the security policy.

12. A method performed by a computer for discovering security zone classifications of network areas, comprising:
representing actually allowed network flows and flows permitted by a security policy in a format that enables comparison by employing a unified framework through feasibility set analysis, wherein the actually allowed network flows and the security policy are provided in a networked computing environment including network areas, wherein each network area is a collection of one or more computing and network devices, and enterprise security policy defines the security requirements for security classifications;
collecting information on the actually allowed network flows in multiple stages, wherein the information collecting at a next stage is deployed at only fewer network devices than a previous stage for incrementally determining relationships between hosts of each actually allowed network flow; and
discovering security zone classifications of each network area by comparing the information on the actually allowed network flows with the flows permitted by the security policy to discover the security classifications of the networks areas by employing an elimination-based inferencing method to eliminate feasible sets of security classifications from consideration and arrive at the security classification for each network area.

13. The method as recited in claim 12 wherein the step of discovering includes successively excluding potential classifications for a network area from an initial assignment of classifications if the actually allowed network flows between that network area and other network areas contradicts the security policy for the potential classifications.

14. The method as recited in claim 12, further comprising solving a constraint satisfaction problem, employing a solver tool, which is formulated by representing the security zone classifications of network areas as variables to be solved, and a requirement that the actually allowed network flows between network areas be compliant with the flows permitted by the security policy as constraints.

15. The method as recited in claim 12, further comprising obtaining information about the actually allowed network flows manually using at least one of a questionnaire and a database record.

16. The method as recited in claim 12, further comprising obtaining information about the actually allowed network flows by analyzing configuration information on one of computing devices and network devices.

17. The method as recited in claim 12, further comprising obtaining information about the actually allowed network flows by analyzing configuration information on security devices.

18. The method as recited in claim 12, further comprising obtaining information about the actually allowed network flows by analyzing responses or non-responses to sending packets between network areas.

19. The method as recited in claim 12, wherein the step of collecting the actually allowed network flows in multiple stages is such that after each stage, analysis is performed to guide the collecting in a next stage to improve efficiency and scalability of information collection in later stages than if all the stages were concurrently executed.

20. A computer readable storage device comprising a computer readable program, wherein the computer readable program when executed on a computer causes the computer to perform the steps as recited in claim 12.

21. A system for automatically discovering security zone classifications, comprising:
a processing device configured to format at least one of actually allowed network flows and flows permitted by a security policy to enable a comparison therebetween, the processing device further configured to compare the actually allowed network flows and the flows permitted by the security policy, wherein the actually allowed network flows and the flows permitted by the security policy occur between network areas, wherein each network area is a collection of one or more computing and network devices, the network areas being part of a networked computing environment, and security zone classifications being defined by a security policy and wherein information on the actually allowed network flows is collected in multiple stages, wherein the information collecting at a next stage is deployed at only fewer network devices than a previous stage for incrementally determining relationships between hosts of each actually allowed network flow; and
a program method stored in memory and configured to discover security zone classifications for each network area by excluding a potential assignment of security zone classifications to network areas if the actually allowed network flows are not compliant with the flows permitted by the security policy.

22. The system as recited in claim 21, wherein the program method successively excludes potential security zone classifications for a network area from an initial discovery of security zone classifications if the actually allowed network flows between that network area and other network areas contradict the security policy for the security zone classifications.

23. The system as recited in claim 21, further comprising a solver tool configured to solve a constraint satisfaction problem, which is formulated by representing security zone classifications of the network areas as variables to be solved, and a requirement that actually allowed network flows between network areas be compliant with the flows permitted by the security policy as constraints.

24. The system as recited in claim 21 wherein information about the actually allowed network flows is obtained by one or more of a manual process, configuration information on computing devices, configuration information on network devices, configuration information on security devices, logs on computing devices, logs on network devices, logs on security devices, packet sniffing, and responses or non-responses to sending packets between network areas.

25. The system as recited in claim 21, wherein the actually allowed network flows are obtained in multiple stages, such that after each stage, analysis is performed to guide the information collection in a next stage to improve efficiency and scalability of information collection in later stages than if all the stages were concurrently executed.

* * * * *